(12) United States Patent
Persson et al.

(10) Patent No.: US 9,600,052 B2
(45) Date of Patent: Mar. 21, 2017

(54) PEAK CURRENT HANDLER

(71) Applicant: Sony Corporation, Tokyo (JP)

(72) Inventors: Ingmar Persson, Lund (SE); Magnus Persson, Lund (SE); Ola Jönsson, Lund (SE); Magnus Tillgren, Lund (SE)

(73) Assignee: Sony Mobile Communications Inc., Tokyo (JP)

( * ) Notice: Subject to any disclaimer, the term of this patent is extended or adjusted under 35 U.S.C. 154(b) by 93 days.

(21) Appl. No.: 14/660,117

(22) Filed: Mar. 17, 2015

(65) Prior Publication Data

US 2016/0274640 A1   Sep. 22, 2016

(51) Int. Cl.
*G06F 1/32* (2006.01)

(52) U.S. Cl.
CPC ............ *G06F 1/3206* (2013.01); *G06F 1/324* (2013.01); *G06F 1/3275* (2013.01); *G06F 1/3287* (2013.01); *G06F 1/3296* (2013.01)

(58) Field of Classification Search
CPC ....... G06F 1/3206; G06F 1/324; G06F 1/3275
See application file for complete search history.

(56) References Cited

U.S. PATENT DOCUMENTS

| | | | | |
|---|---|---|---|---|
| 2008/0058999 A1* | 3/2008 | Khodorkovsky | ....... | G06F 1/206 700/297 |
| 2008/0161070 A1* | 7/2008 | Lee | .................. | H04W 52/0264 455/572 |
| 2009/0081971 A1* | 3/2009 | Rofougaran | ........ | H04W 52/245 455/127.1 |
| 2012/0054752 A1* | 3/2012 | Chin | ..................... | G06F 1/3278 718/100 |
| 2012/0144215 A1* | 6/2012 | Naffziger | .................. | G06F 1/26 713/320 |
| 2013/0124885 A1 | 5/2013 | Davis et al. | | |
| 2014/0380072 A1 | 12/2014 | Lee | | |

FOREIGN PATENT DOCUMENTS

EP    2 560 073    2/2013

OTHER PUBLICATIONS

International Search Report and Written Opinion dated Mar. 14, 2016 for corresponding International Application No. PCT/IB2016/050069.

* cited by examiner

*Primary Examiner* — Stefan Stoynov
(74) *Attorney, Agent, or Firm* — Renner, Otto, Boisselle & Sklar, LLP.

(57) ABSTRACT

A device and method for limiting peak current draw in an electronic device includes identifying an operational state of the electronic device, and accessing data stored in the electronic device, the data including possible operational states of the electronic device and respective configuration data for maintaining an electric current consumption of the electronic device below a prescribed threshold. Operational parameters of the electronic device are modified based on the data obtained from memory to maintain the electric current consumption of the electronic device below the prescribed threshold.

20 Claims, 3 Drawing Sheets

| Desired functions | | | | Allowed functions | | | |
|---|---|---|---|---|---|---|---|
| LTE Freq | WLAN | Backlight | CPU Freq | LTE Freq | WLAN | Backlight | CPU Freq |
| - | - | Yes | 400 MHz | - | - | 100% | - |
| - | 10Mb/s | Yes | 600 MHz | - | 6Mb/s | <70% | 500 MHz |
| ⋮ | ⋮ | | | | ⋮ | | |
| - | 10Mb/s | Yes | 400 MHz | - | 7Mb/s | <70% | 400 MHz |

PEAK CURRENT HANDLER

TECHNICAL FIELD OF THE INVENTION

The technology of the present disclosure relates generally to electronic devices and, more particularly, to an apparatus and method for limiting peak current consumption by an electronic device.

BACKGROUND

As the size of electronic devices continue to shrink there is less space available for a battery that powers the electronic device. For example, due to size limitations a smart watch battery may be considerably smaller than a smart phone battery. Consequently, the energy available to the smart watch may be significantly less than the energy available to the smart phone.

Current consumption in an electronic device can vary based on a number of factors. Should the current consumption exceed a prescribed level, the voltage output by the battery may drop to a point where the electronic device may shut down (a low voltage condition). As will be appreciated, this is undesirable as the user cannot use the device.

SUMMARY

A device and method in accordance with the present disclosure can prevent device shutdown due to high current demand. More particularly, an operational state of an electronic device, which may include, for example, which and how many applications are executing and/or are about to execute, a brightness of the display device, active wireless connections, etc., is determined. Based on the determined operational state, a current consumption of the electronic device is estimated based on predetermined data that may be stored, for example, in memory of the electronic device. If the estimated current consumption exceeds a threshold value, then system parameters are adjusted to maintain peak current consumption below a prescribed threshold level. In this manner, a low voltage condition can be avoided and device operation maintained.

According to one aspect of the present disclosure, an electronic device includes: a memory; data stored in memory, the data including possible operational states of the electronic device and respective configuration data for maintaining an electric current consumption of the electronic device below a prescribed threshold; and a control circuit configured to: identify an operational state of the electronic device; obtain from memory the data corresponding to the identified operational state; modify operational parameters of the electronic device based on the data obtained from memory to maintain the electric current consumption of the electronic device below the prescribed threshold.

According to another aspect of the present disclosure, a method for limiting peak current draw in an electronic device includes: dentifying an operational state of the electronic device; accessing data stored in the electronic device, the data including possible operational states of the electronic device and respective configuration data for maintaining an electric current consumption of the electronic device below a prescribed threshold; and modifying operational parameters of the electronic device based on the data obtained from memory to maintain the electric current consumption of the electronic device below the prescribed threshold.

To the accomplishment of the foregoing and the related ends, the device and method comprises the features hereinafter fully described in the specification and particularly pointed out in the claims, the following description and the annexed drawings setting forth in detail certain illustrative embodiments, these being indicative, however, of but several of the various ways in which the principles of the invention may be suitably employed.

Although the various features are described and are illustrated in respective drawings/embodiments, it will be appreciated that features of a given drawing or embodiment may be used in one or more other drawings or embodiments of the invention.

DETAILED DESCRIPTION OF EMBODIMENTS

Figure 1:
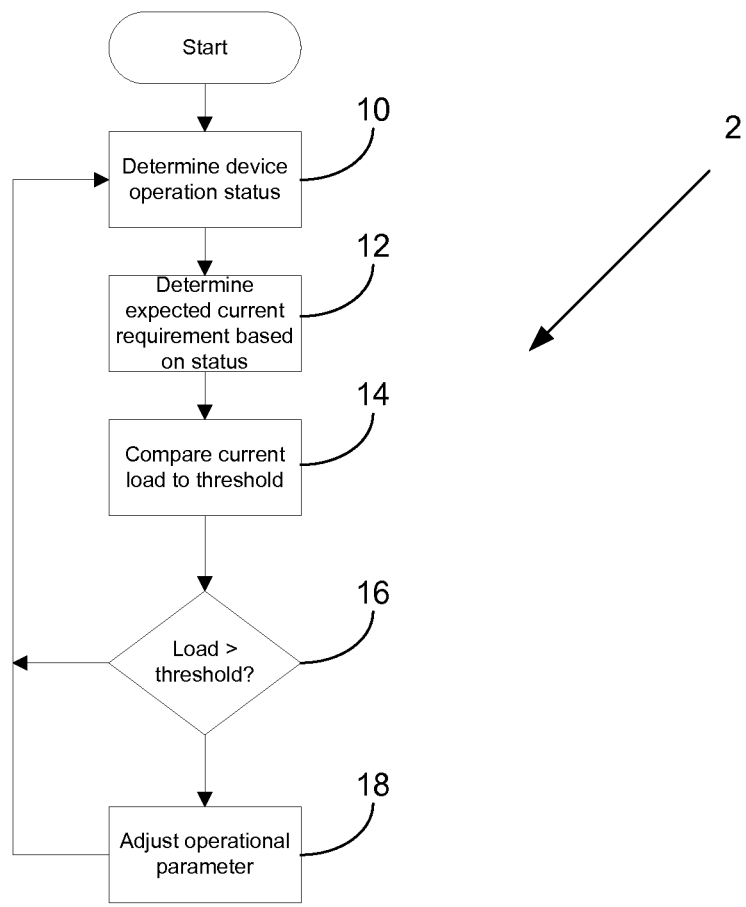
FIG. 1 is a flow chart illustrating exemplary steps for implementing a peak current handler in accordance with an embodiment of the present disclosure.

Embodiments will now be described with reference to the drawings, wherein like reference numerals are used to refer to like elements throughout. It will be understood that the figures are not necessarily to scale. Also, features that are described and/or illustrated with respect to one embodiment may be used in the same way or in a similar way in one or more other embodiments and/or in combination with or instead of the features of the other embodiments.

The present disclosure describes a device and method for limiting peak current consumption in an electronic device. In accordance with the present disclosure, the device and method determine the operational state of the electronic device at a given point in time. The determined operational state, which may include one or more different use cases, is used to access a database, lookup table, or the like. The database/lookup table stores various operational states of the electronic device along with a current consumption associated with each operational state. By locating the determined operational state(s) in the database/lookup table, the corresponding current consumption can be retrieved. The current consumption associated with the operational state then can be compared to a threshold level. If the current consumption exceeds the threshold level, operating parameters of the electronic device can be adjusted to reduce current consumption.

Referring initially to FIG. 1, illustrated is a flow diagram that depicts an exemplary method for limiting peak current consumption in an electronic device. Although the method descriptions and flow chart may show specific orders of executing steps, the order of executing the steps may be changed relative to the order described. Also, two or more steps described in succession may be executed concurrently or with partial concurrence. One or more of the described or illustrated steps may be omitted.

The exemplary method of FIG. 1 may be implemented using coded instructions (e.g., computer readable instructions) stored on one or more non-transitory computer readable media such as flash memory, read-only memory (ROM), random-access memory (RAM), cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Typical non-transitory computer readable media include electronic memory devices, magnetic memory devices and optical memory devices. The method may be executed by an electronic device. In one embodiment, to carry out the method, the logical instructions embodying the method are executed by a processor of the electronic device. Alternatively, the method may be at least partially implemented in hardware of the electronic device (e.g., an application-specific integrated circuit (ASIC) or the like.

The method may begin at step 10, where the processor executes logical instructions to determine an operational state of the electronic device. As used herein, the "operational state of the electronic device" is defined as the particular functions that are executing and/or requested to execute (but not yet executing) on the electronic device at a moment in time, and a status of subsystems of the electronic device at the moment in time. The status of subsystems may include, for example, an intensity of a display backlight, the temperature of the processor and/or memory of the electronic device, the particular wireless transmitters that are active in the electronic device, power levels of the wireless transmitters, bit rates of data transmitted via the wireless transmitters, clock frequencies, processor load, etc.

In determining the operational state, the processor may access memory of the electronic device and/or read hardware registers to determine which applications are currently running or have been requested to run. The processor also may query other subsystems, such as a back light controller of the electronic device to determine an intensity of a display backlight, a wireless radio controller of the electronic device to determine if data transfer is occurring, and if so a bit rate of the data transfer, a power output of the transceiver, and so forth.

For example, a first operational state may have first and second applications (APP1 and APP2) executing on the electronic device, where APP2 is streaming music via a WiFi connection, and the display backlight of the electronic device is in an OFF state. A second operational state may have both APP1 and APP2 executing as in the first operational state, but the backlight is in an ON state with a brightness of 75 percent of maximum brightness. As will be appreciated, there can be any number of operational states based on the various permutations dictated by the various settings of the electronic device and applications executing on the electronic device.

Next at step 12 the processor determines the current consumption associated with the determined operational state. In one embodiment, the current consumption is obtained by accessing a data store, such as a database or lookup table stored in memory of the electronic device, having a plurality of entries for each operational state and an electric current consumption corresponding to the respective operational state.

Figures 2, 5:
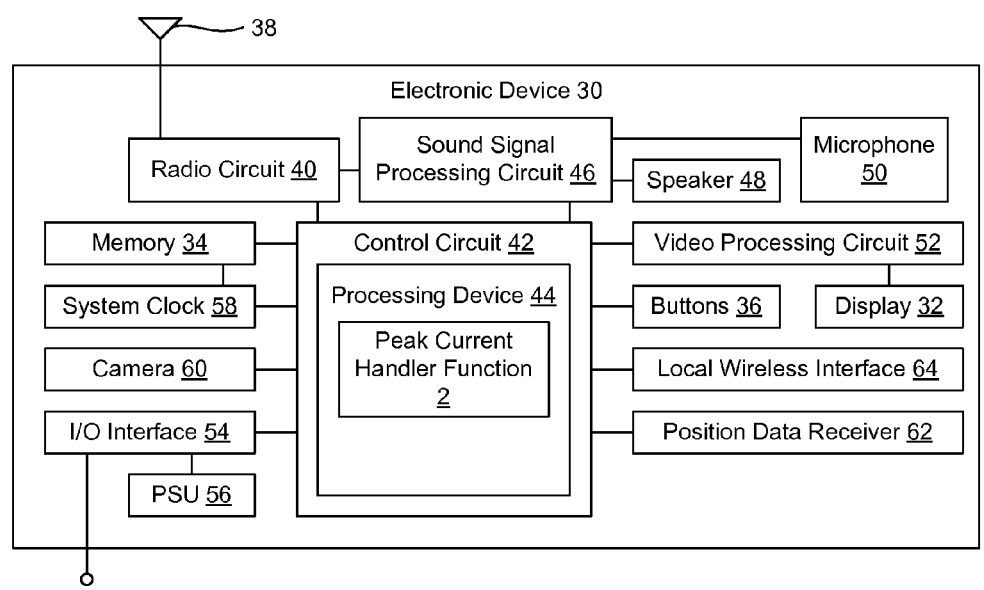
FIG. 2 illustrates a data store for associating functions/tasks/states and associated current consumption.
FIG. 5 is a schematic diagram illustrating an exemplary electronic device that includes a peak current handler in accordance with the present disclosure.

With additional reference to FIG. 2, an exemplary data store 20 in the form of a lookup table is illustrated having a plurality of rows 22 and columns 24. A first column 24a represents the various functions/tasks/systems of the electronic device, and a second column 24b represents the various current consumptions. The intersection of each row 22a-22n with the first column 24a defines an individual function/task/system, and the intersection of each row 22a-22n with the second column 24b defines the current consumption associated with that function/task/system. Preferably, the current consumption associated with each function/task is measured in a lab environment and pre-stored in the data store 20, which may reside in memory of the electronic device.

The data store in FIG. 2 may include any number of functions/tasks/system as dictated by the specific electronic device, and those shown in FIG. 2 are merely exemplary. Also, the data store 20 may take on other forms, and the depiction in FIG. 2 is merely an exemplary embodiment.

The processor can search the data store 20 to locate the active functions/tasks/systems identified in step 10, and retrieve the current consumption associated with each active function/task/system. The current consumption for each function/task/system then can be summed to determine a total expected current consumption of the electronic device.

Next at step 14 the total expected current consumption as determined at step 12 is compared to a threshold value to determine if any action should be taken. The threshold value is preferably set such that current consumption up to the threshold value does not cause a drop in battery voltage that would trigger a device shutdown. Such threshold may be preset in the electronic device and/or may be updated based on an age and/or expected remaining life of the battery.

At step 16, if the expected current consumption is less than or equal to the threshold value then there is sufficient battery power to carry out normal operation of the electronic device. Therefore, no action need be taken and the method moves back to step 10 and the method repeats. However, if the expected current consumption is greater than the threshold value then if further action is not taken battery voltage may dip to levels that could cause shutdown of the electronic device. To avoid such condition, at step 18 the processor modifies one or more operational parameters of the electronic device in an attempt to reduce current consumption.

For example, a bit rate of a wireless communication link (e.g., a wireless local area network bit rate or a GSM bit rate) may be reduced to minimize power consumption. In reducing the bit rate, the degree in which the expected current consumption exceeds the threshold level may be taken into account. For example, it may be known from measurements made in the lab environment that for each megabit decrease in bit rate current consumption also decreases by 10 mA (such measurement data may be stored in memory of the electronic device). If the expected current consumption exceeds the threshold by 100 mA, then the bit rate can be reduced by ten megabits to prevent total current consumption from exceeding the threshold value.

Similarly, a transmission power of a wireless transmitter may be decreased and/or a clock frequency of the electronic device (e.g., a CPU or memory clock frequency) may be reduced to minimize current consumption. Again, measurements can be made in the lab environment to determine the correlation between transmission power and current consumption, and the correlation between clock frequency and current consumption. Such measurement data can be stored in memory of the electronic device, e.g., in the data store 20 or in a separate storage area. The comparison of the expected current consumption and the current threshold as set forth at steps 14 and 16 then can be used to determine how much current must be shed.

For example, if the threshold value is set at 700 mA and the expected current consumption as determined in step 12 is 770 mA, then at least 70 mA will need to be shed in order to prevent a low-voltage situation. Parameters associated with transmission power and/or clock frequency can be adjusted to shed the required current.

Yet another operational parameter that may be modified to reduce current consumption is the intensity of the display device's backlight. As will be appreciated, the brighter (more intense) the backlight the more current will be consumed. A correlation between backlight intensity and current consumption can be measured in the lab environment and stored in memory of the electronic device. Such data then can be used to adjust backlight brightness in order to maintain peak current consumption below the threshold value as discussed above.

In adjusting the operational parameters, the processor may adjust a single operational parameter at a time or it may simultaneously adjust a number of operational parameters in order to limit peak current consumption. Additionally or alternatively, the processor may inhibit certain functions/tasks in order to maintain peak current below the threshold value. For example, prior to executing an application or enabling a subsystem the method may conclude that no matter how the operational parameters are adjusted the peak current will exceed the threshold value. In such scenario, the method may simply prevent the application/subsystem from being enabled.

Also, in selecting which operational parameters to modify, certain operational parameters may be given priority of overs. For example, maintaining bit rate may be given priority over backlight intensity (or vice versa). Thus, in limiting peak current consumption the method will adjust backlight intensity first, and only adjust bit rate if adjustment of backlight intensity cannot provide the necessary reduction in current consumption. Such priority settings may be preset in the electronic device or user adjustable.

An advantage of the method in accordance with the present disclosure is that it provides smoother results when compared to conventional methods. More particularly, prior art methods attempt to measure actual current draw and tweak hardware to limit the current. This results in coarse regulation, which can be problematic when operating near the peak current threshold as the coarseness may result in instances in which the peak current threshold is exceeded. The smoother operation of the device and method in accordance with the present disclosure enables operation near the peak current limit without exceeding it.

Figures 3, 4:
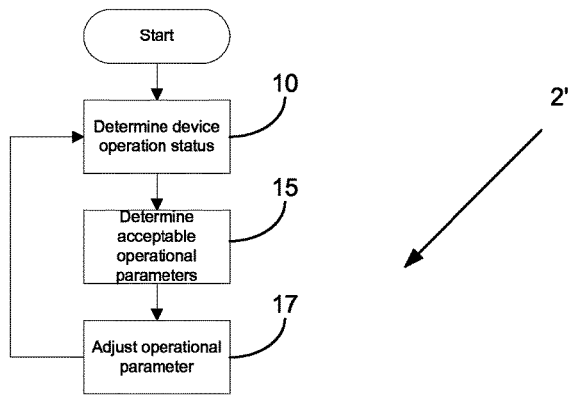
FIG. 3 illustrates a data store of functions/tasks/states of the electronic device in accordance with another embodiment of the present disclosure.
FIG. 4 is a flow chart illustrating exemplary steps for implementing a peak current handler in accordance with another embodiment of the present disclosure.

Instead of using a database/lookup table that includes the electric current consumption for each function/task/state, a database that indicates permissible combinations of different functions/tasks/states may be used. For example, and with reference to FIG. 3, illustrated is a table 25 in accordance with another embodiment of the present disclosure. The table that shows possible combinations of different functions/tasks/states, where a first half 26 of the table illustrates a desired combination of functions/tasks/states and a second half 28 of the table illustrates permissible combinations of the desired functions/tasks/states.

For example, it may be desired to operate the electronic device using 10 Mb/s WLAN, the backlight enabled, and the processor operating at 600 MHz. It may be known from testing in the lab, however, that such combination results in excessive current draw. It also may be known from lab testing that an acceptable compromise for such combination of functions/tasks/state is to operate the WLAN at 6 Mb/s, the backlight at less than 70 percent illumination, and the processor at 500 MHz. Such alternate combination can be used as the basis for modifying parameters of the electronic device.

While the example of FIG. 3 illustrates only several possible combinations, this is simply for sake of clarity. There may be any number of possible combinations of functions/tasks/states of the electronic device, and in operation such possible combinations may be included in the table FIG. 3.

FIG. 4 illustrates a revised method 2' in accordance with the second embodiment. The method may begin at step 10, where the processor executes logical instructions to determine an operational state of the electronic device. Step 10 corresponds to step 10 in FIG. 1 and thus further details regarding this step are omitted for sake of brevity.

Next at step 15, the operational state of the electronic device is compared to permissible operational states. In this regard, the processor may access the table illustrated in FIG. 3, where the current/requested operational state of the electronic device is compared to predefined operational states. Upon a match being found for the current/requested operational state, at step 17 the operational parameters of the electronic device are adjusted as set forth in the table. The method then moves back to step 10 and repeats.

The above-described methods may be performed by an electronic device 30, an example of which is illustrated in FIG. 5. The electronic device 30 may be any type of electronic device in which it is desired to limit the peak current draw from batteries of the electronic device, examples of which include a smart watch, a head set, a media player, a gaming device, a communicator, a portable communication apparatus, a bracelet, visors, a phone attached to the arm, a ring, etc.

The electronic device 30 includes the peak current handler function 2 that is configured to prevent peak current draw exceeding a prescribed threshold as described with respect to FIGS. 1-4.

The electronic device 30 may include a display 32. The display 32 displays information to a user such as operating state, time, telephone numbers, contact information, various menus, etc., that enable the user to utilize the various features of the electronic device 30. The display 32 also may be used to visually display content received by the electronic device 30 and/or retrieved from a memory 34 of the electronic device 30. The display 32 may be used to present images, video and other graphics to the user, such as photographs, mobile television content, Internet pages, and video associated with games.

Buttons 36 provide for a variety of user input operations, and in an electronic device embodied as a smart watch may be arranged along a side or edge of the smart watch. For example, the buttons 36 may include buttons for allowing entry of information, special function buttons (e.g., one or more of a call send and answer button, multimedia playback control buttons, a camera shutter button, etc.), navigation and select buttons or a pointing device, and so forth. Buttons or button-like functionality also may be embodied as a touch screen associated with the display 32. Also, the display 32 and buttons 36 may be used in conjunction with one another to implement soft key functionality.

The electronic device 30 includes communications circuitry that enables the electronic device 30 to establish communications with another device. Communications may include calls, data transfers, and the like. Calls may take any suitable form such as, but not limited to, voice calls and video calls. The calls may be carried out over a cellular circuit-switched network or may be in the form of a voice over Internet Protocol (VoIP) call that is established over a packet-switched capability of a cellular network or over an alternative packet-switched network (e.g., a network compatible with IEEE 802.11, which is commonly referred to as WiFi, or a network compatible with IEEE 802.16, which is commonly referred to as WiMAX), for example. Data transfers may include, but are not limited to, receiving streaming content (e.g., streaming audio, streaming video, etc.), receiving data feeds (e.g., pushed data, podcasts, really simple syndication (RSS) data feeds data feeds), downloading and/or uploading data (e.g., image files, video files, audio files, ring tones, Internet content, etc.), receiving or sending messages (e.g., text messages, instant messages, electronic mail messages, multimedia messages), and so forth. This data may be processed by the electronic device 30, including storing the data in the memory 34, executing applications to allow user interaction with the data, displaying video and/or image content associated with the data, outputting audio sounds associated with the data, and so forth.

In the exemplary embodiment, the communications circuitry may include an antenna 38 coupled to a radio circuit 40. The radio circuit 40 includes a radio frequency transmitter and receiver for transmitting and receiving signals via the antenna 38.

The radio circuit 40 may be configured to operate in a mobile communications system. Radio circuit 40 types for interaction with a mobile radio network and/or broadcasting network include, but are not limited to, global system for mobile communications (GSM), code division multiple access (CDMA), wideband CDMA (WCDMA), general packet radio service (GPRS), WiFi, WiMAX, digital video broadcasting-handheld (DVB-H), integrated services digital broadcasting (ISDB), high speed packet access (HSPA), etc., as well as advanced versions of these standards or any other appropriate standard. It will be appreciated that the electronic device 30 may be capable of communicating using more than one standard. Therefore, the antenna 38 and the radio circuit 40 may represent one or more than one radio transceiver.

The electronic device 30 may include a primary control circuit 42 that is configured to carry out overall control of the functions and operations of the electronic device 30. The control circuit 42 may include a processing device 44, such as a central processing unit (CPU), microcontroller or microprocessor. The processing device 44 executes code stored in a memory (not shown) within the control circuit 34 and/or in a separate memory, such as the memory 34, in order to carry out operation of the electronic device 30. For instance, the processing device 44 may execute code that implements the peak current handler function 2. The memory 34 may be, for example, one or more of a buffer, a flash memory, a hard drive, a removable media, a volatile memory, a non-volatile memory, a random access memory (RAM), or other suitable device. In a typical arrangement, the memory 34 may include a non-volatile memory for long term data storage and a volatile memory that functions as system memory for the control circuit 42. The memory 34 may exchange data with the control circuit 42 over a data bus. Accompanying control lines and an address bus between the memory 34 and the control circuit 42 also may be present.

The electronic device 30 may further include a sound signal processing circuit 46 for processing audio signals transmitted by and received from the radio circuit 40. Coupled to the sound processing circuit 46 are a speaker 48 and a microphone 50 that enable a user to listen and speak via the electronic device 30. The radio circuit 40 and sound processing circuit 44 are each coupled to the control circuit 42 so as to carry out overall operation. Audio data may be passed from the control circuit 42 to the sound signal processing circuit 46 for playback to the user. The audio data may include, for example, audio data from an audio file stored by the memory 34 and retrieved by the control circuit 42, or received audio data such as in the form of voice communications or streaming audio data from a mobile radio service. The sound processing circuit 44 may include any appropriate buffers, decoders, amplifiers and so forth.

The display 32 may be coupled to the control circuit 42 by a video processing circuit 52 that converts video data to a video signal used to drive the display 32. The video processing circuit 52 may include any appropriate buffers, decoders, video data processors and so forth. The video data may be generated by the control circuit 42, retrieved from a video file that is stored in the memory 34, derived from an incoming video data stream that is received by the radio circuit 40 or obtained by any other suitable method.

The electronic device 30 may further include one or more input/output (I/O) interface(s) 54. The I/O interface(s) 54 may be in the form of typical smart watch I/O interfaces and may include one or more electrical connectors. The I/O interfaces 54 may form one or more data ports for connecting the electronic device 30 to another device (e.g., a computer) or an accessory (e.g., a personal hands free (PHF) device) via a cable. Further, operating power may be received over the I/O interface(s) 54 and power to charge a battery of a power supply unit (PSU) 56 within the electronic device 30 may be received over the I/O interface(s) 54. The PSU 56 may supply power to operate the electronic device 30 in the absence of an external power source.

The electronic device 30 also may include various other components. For instance, a system clock 58 may clock components such as the control circuit 42 and the memory 34. A camera 60 may be present for taking digital pictures and/or movies. Image and/or video files corresponding to the pictures and/or movies may be stored in the memory 34. A position data receiver 62, such as a global positioning system (GPS) receiver, Galileo satellite system receiver or the like, may be involved in determining the position of the electronic device 30. A local wireless interface 64, such as an infrared transceiver and/or an RF transceiver (e.g., a Bluetooth chipset) may be used to establish communication with a nearby device, such as an accessory (e.g., a PHF device), another mobile radio terminal, a computer or another device.

Although certain embodiments have been shown and described, it is understood that equivalents and modifications falling within the scope of the appended claims will occur to others who are skilled in the art upon the reading and understanding of this specification.

What is claimed is:

1. An electronic device comprising:
   a memory;
   data stored in memory, the data including possible operational states of the electronic device and respective configuration data for maintaining an electric current consumption of the electronic device below a prescribed threshold current; and
   a control circuit configured to:
   identify an operational state of the electronic device;
   obtain from memory the data corresponding to the identified operational state;

determine from the data corresponding to the identified operational state whether unintended operation of the electronic device may occur due to current consumption of the electronic device exceeding the prescribed threshold current;

after determining unintended operation of the electronic device may occur, modify operational parameters of the electronic device based on the data obtained from memory to maintain the electric current consumption of the electronic device below the prescribed threshold current.

2. The electronic device according to claim 1, wherein the configuration data comprises an electric current consumption for each respective operational state, and where the control circuit is configured to:

obtain from the data stored in memory an electric current consumption corresponding to the identified operational state;

modify operational parameters of the electronic device when the electric current consumption for the identified operational state exceeds the prescribed current threshold.

3. The electronic device according to claim 1, wherein the electronic device comprises at least one of a smart watch, a head set, a media player, a gaming device, a portable communication apparatus, a bracelet, a visor, or a ring.

4. The electronic device according to claim 1, wherein the data is stored in the form of a lookup table, the lookup table having a plurality of entries for each operational state and an electric current consumption corresponding to the respective operational state.

5. The electronic device according to claim 2, wherein the control circuit is configured to modify a bit rate of a wireless communication transceiver when the electric current consumption for the identified operational state exceeds the prescribed current threshold.

6. The electronic device according to claim 5, wherein bit rate comprises at least one of a wireless local area network bit rate or a GSM bit rate.

7. The electronic device according to claim 2, wherein the control circuit is configured to modify a transmission power of a wireless transmitter when the electric current consumption for the operational state exceeds the prescribed threshold.

8. The electronic device according to claim 2, wherein the control circuit is configured to modify a clock frequency of the electronic device when the electric current consumption for the operational state exceeds the prescribed threshold.

9. The electronic device according to claim 8, wherein the clock frequency comprises at least one of a CPU clock frequency or a memory clock frequency.

10. The electronic device according to claim 2, wherein the control circuit is configured to modify a backlight intensity level when the electric current consumption for the identified operational state exceeds the prescribed threshold.

11. A method for limiting peak current draw in an electronic device, comprising:

identifying an operational state of the electronic device;

accessing data stored in the electronic device, the data including possible operational states of the electronic device and respective configuration data for maintaining an electric current consumption of the electronic device below a prescribed threshold current; and determining from the data corresponding to the identified operational state whether unintended operation of the electronic device may occur due to current consumption of the electronic device exceeding the prescribed threshold current;

after determining unintended operation of the electronic device may occur, modifying operational parameters of the electronic device based on the data obtained from memory to maintain the electric current consumption of the electronic device below the prescribed threshold.

12. The method according to claim 11, wherein the data stored in the electronic device comprises an electric current consumption corresponding to each operational state, wherein accessing includes obtaining an electric current consumption corresponding to the identified operational state, and modifying includes modifying operational parameters when the electric current consumption for the identified operational state exceeds a prescribed threshold.

13. The method according to claim 12, wherein obtaining an electric current consumption corresponding to the identified operational state comprises accessing a lookup table having a plurality of entries for possible operational states and an electric current consumption corresponding to the respective operational state.

14. The method according to claim 11, wherein modifying operational parameters comprises modifying a bit rate of a wireless communication link.

15. The method according to claim 14, wherein modifying the bit rate comprises modifying at least one of a wireless local area network bit rate or a GSM bit rate.

16. The method according to claim 11, wherein modifying operational parameters comprises modifying a transmission power of a wireless transmitter.

17. The method according to claim 11, wherein modifying operational parameters comprises modifying a clock frequency of the electronic device.

18. The method according to claim 17, wherein modifying the clock frequency includes modifying at least one of a CPU clock frequency or a memory clock frequency.

19. The method according to claim 11, wherein modifying operational parameters comprises modifying a backlight intensity level.

20. The method according to claim 11, wherein the operational state comprises at least one of executing an application, wireless transmission of data, or control of a display device.

* * * * *